United States Patent [19]

Fushiya

[11] Patent Number: 5,005,295
[45] Date of Patent: Apr. 9, 1991

[54] PORTABLE POWER DRIVEN TOOL
[75] Inventor: Fusao Fushiya, Anjo, Japan
[73] Assignee: Makita Electric Works, Ltd., Anjo, Japan
[21] Appl. No.: 522,824
[22] Filed: May 14, 1990
[30] Foreign Application Priority Data
May 17, 1989 [JP] Japan .................. 1-123073
[51] Int. Cl.$^5$ .................................. B27G 19/02
[52] U.S. Cl. ........................ 30/390; 30/391; 83/DIG. 1
[58] Field of Search .............. 30/390, 233, 520, 391; 83/DIG. 1

[56] References Cited
U.S. PATENT DOCUMENTS

| | | | |
|---|---|---|---|
| 2,228,664 | 1/1941 | Knouse et al. | 30/391 |
| 4,378,637 | 4/1983 | Kieser et al. | 30/216 |
| 4,543,723 | 10/1985 | Bortfeld et al. | 30/381 |
| 4,589,208 | 5/1986 | Iwasaki et al. | 30/376 |
| 4,756,220 | 7/1988 | Olson et al. | 83/375 |

Primary Examiner—Douglas D. Watts
Assistant Examiner—John M. Husar
Attorney, Agent, or Firm—Dennison, Meserole, Pollack & Scheiner

[57] ABSTRACT

A portable power driven tool includes a body having a motor therein and a handle. The handle includes a first grip portion to be grasped by an operator in one hand and a second grip portion to be grasped by the operator in another hand. The second grip portion is disposed at a position different from the first grip portion. A switch is provided in a circuit connecting the motor with a power source. The switch can be operated by the operator at the first grip portion so as to be turned on or off for starting or stopping the motor. For preventing the motor from being started by the switch, prevention means is operable by the operator at the second grip portion.

6 Claims, 6 Drawing Sheets

PORTABLE POWER DRIVEN TOOL

BACKGROUND OF THE INVENTION

1. Field of the Invention

The present invention relates to a portable power driven tool such as a portable circular saw and particularly to a portable power driven tool which is used by an operator with a tool body grasped with both hands.

2. Description of the Prior Art

A conventional portable power driven tool such as a portable circular saw includes a body, a handle mounted on the body, a motor disposed within the body, a switch for starting the motor and a trigger for operating the switch. The switch is turned on or off by pushing the trigger when the handle is grasped or by subsequently releasing the trigger. The operation of the switch to turn on and subsequently to turn off is performed in each cutting operation. In such a portable power driven tool, the trigger may be accidentally pushed to turn the switch on so as to start the motor when the tool is in its standby condition for subsequent cutting operation after a first operation has been finished.

For preventing the trigger from accidentally being pushed, it has been proposed to provide lock means in the vicinity of the trigger. The lock means prevents the trigger from being pushed unless it is released from its locking engagement.

U.S. Pat. No. 3,245,439 discloses a portable circular saw having a trigger of conventional type. U.S. Pat. No. 4,516,324 discloses a portable circular saw having a handle and a handgrip portion intended to be grasped with both hands.

However, in a power driven tool such as a portable circular saw of the type intended to be grasped with both hands of an operator for cutting operation for example, the trigger may be pushed or released by one hand of the operator with the handle grasped in only that hand to turn the switch on or off. The trigger may be operated by one hand even if the above lock means has been provided for the trigger or the switch. Also, the trigger can be operated independently of grasping of the other grip portion in another hand. Thus, the tool is occasionally used by grasping in only one hand, departing from the intended mode of use or use by grasping with both hands and the function of the tool cannot be fully exhibited.

SUMMARY OF THE INVENTION

It is, accordingly, an object of the present invention to provide a portable power driven tool which prevents the operator from operating the tool with a handle grasped in only one hand, and which is always used with the handle grasped with both hands, so that the function of the tool may be fully exhibited.

According to the present invention, there is provided a portable power driven tool comprising:

a body having a motor therein;

a handle including a first grip portion adapted to be grasped by an operator in one hand and a second grip portion adapted to be grasped by the operator in another hand and disposed at a position different from the first grip portion;

a switch provided in a circuit connecting the motor with a power source, the switch being operable by the operator at the first grip portion so as to be turned on or off for starting or stopping the motor; and prevention means operable by the operator at the second grip portion for preventing the motor from being started by the switch.

Preferably, the switch includes a switch body and an operating member mounted on the first grip portion. The operating member is movable between a first position to turn the switch body on and a second position to turn the same off. The prevention means includes lock means which can selectively prevent the operating member from moving to the first position from the second position.

The first grip portion and the second grip portion are integrally formed in the handle. The handle includes a cavity therein extending from the first grip portion to the second grip portion. The lock means includes a lever pivotally mounted on the handle within the cavity, a lock member mounted on one end of the lever and movable between a lock position for engagement with the operating member positioned at the second position, and a non-lock position to permit movement of the operating member to the first position from the second position, and a pusher mounted on the other end of the lever and extending outwardly from the second grip portion of the handle, the pusher being operable by the operator, and a spring forcing the lever to maintain the position of the lock member at the lock position. The lock member can be moved to the non-lock position from the lock position when the handle is grasped by the operator at the second grip portion and the pusher is pushed.

The other end of the lever is connected to the pusher through an opening formed in the second grip portion and the size of the pusher is larger than that of the opening. The pusher is positioned above the handle to maintain a suitable clearance therebetween when the lock member is positioned at the lock position. When the pusher is pushed until it abuts on the handle around the opening, the lock member is moved to the non-lock position.

In another embodiment, the prevention means includes another switch connected in series with the switch in the circuit connecting the power source with the motor. The another switch is normally kept off and may be turned on when the operator grasps the handle at the second grip portion.

The another switch includes a switch body mounted on the second grip portion of the handle and an operating member connected to the switch body. The operating member is forced outwardly of the handle and is normally kept in the position outwardly away from the handle so as to keep the another switch off. The another switch can be turned on when the operating member is pushed toward the handle.

The invention will become more fully apparent from the claims and the description as it proceeds in connection with the drawings.

DETAILED DESCRIPTION OF THE PREFERRED EMBODIMENT

Referring to FIGS. 1 to 5, there is shown a portable circular saw according to a first embodiment of the present invention.

Figure 1:
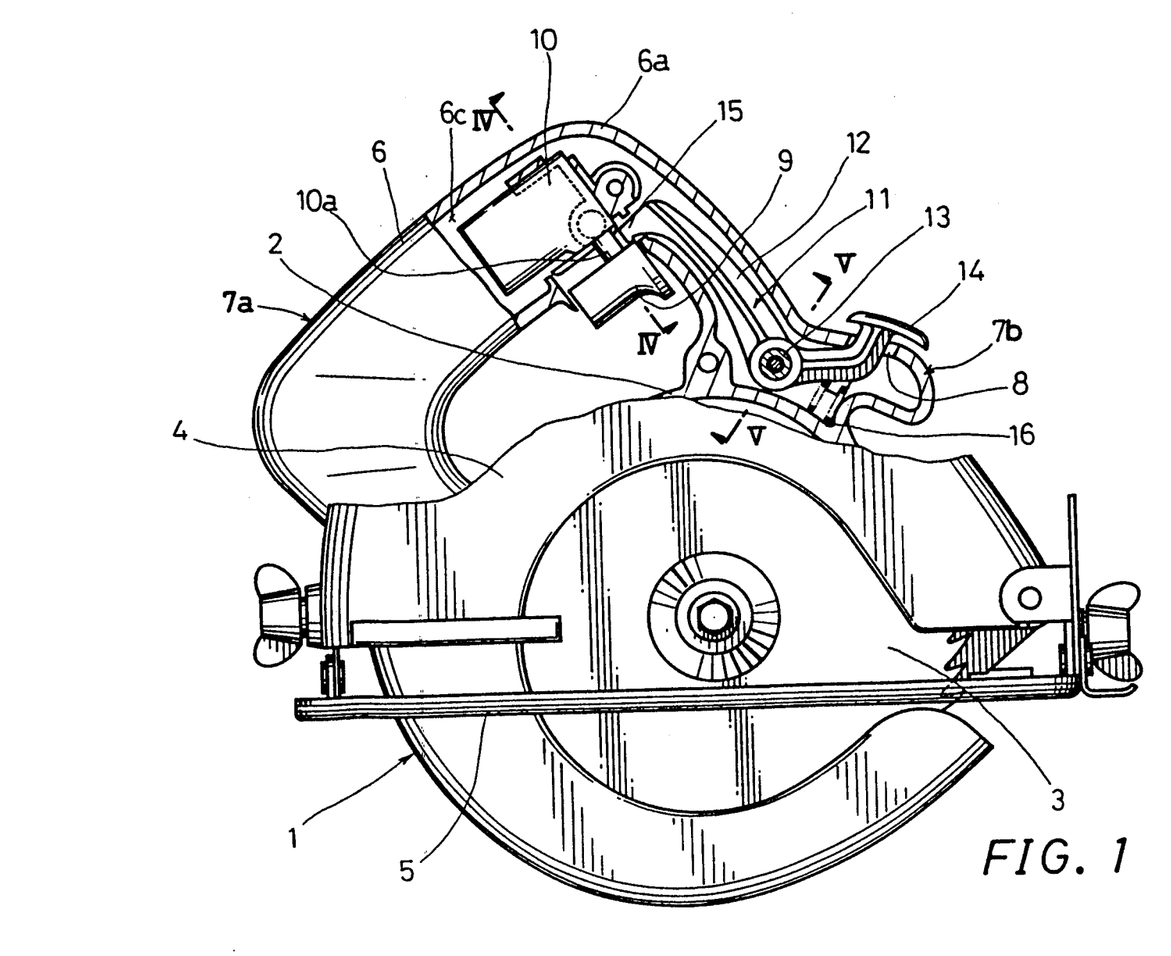
FIG. 1 is a side view of a portable circular saw according to a first embodiment of the present invention, with a part of the handle broken away.

A body 1 of the portable circular saw includes a motor housing 2 in which a motor M and a reduction gear assembly (not shown) are disposed, a circular saw blade 3 mounted to a motor shaft extending from the motor housing 2, a blade case 4 covering the circular saw blade 3 and a saw shoe 5. A beveled and inverted U-shaped handle 6 is formed at the peripheral portion (in the vicinity of the blade case 4) of the motor housing 2.

Figure 2:
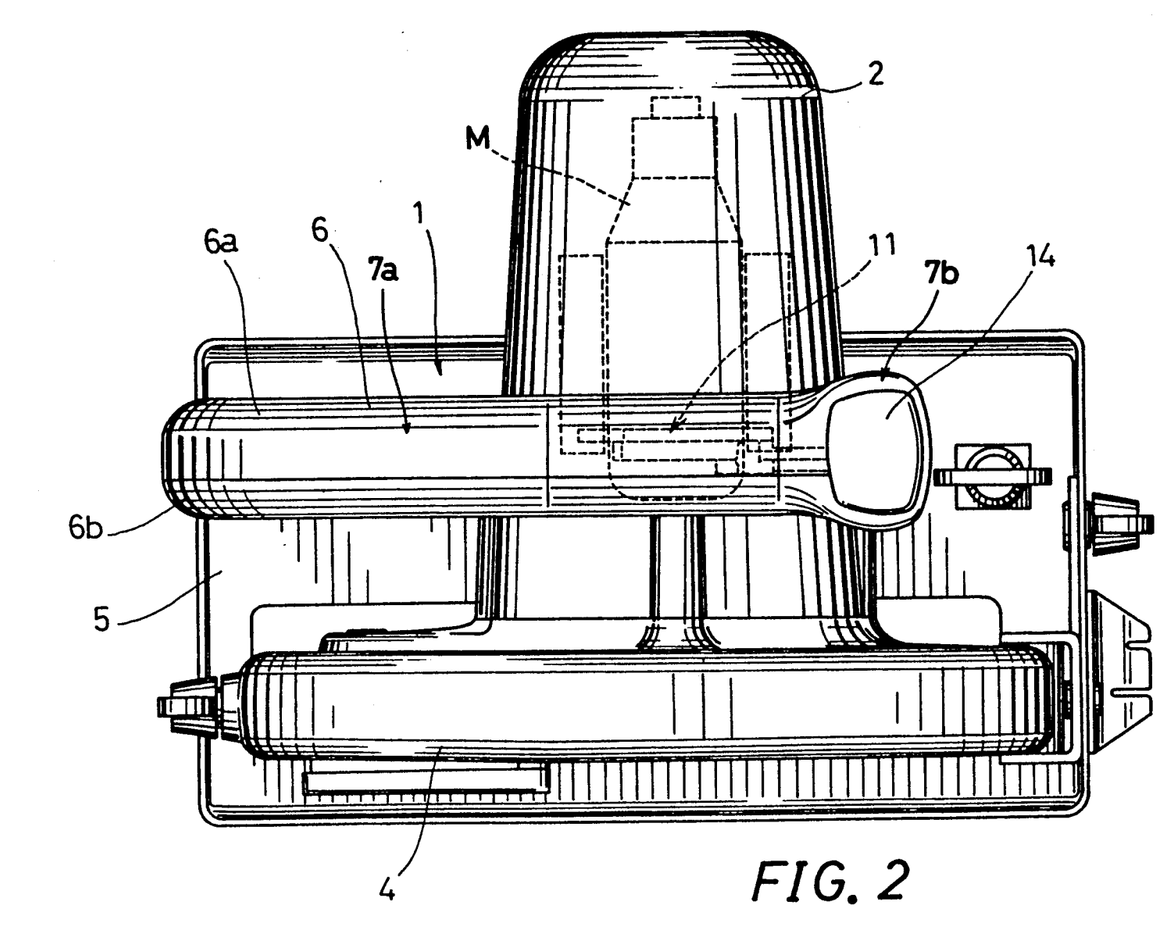
FIG. 2 is a plan view of the saw shown in FIG. 1.

As shown in FIG. 2, the handle 6 is split substantially at the central portion along the longitudinal direction thereof and includes a first half 6a and a second half 6b. The first half 6a and the second half 6b are integrally formed with the motor housing 2 and the blade case 4, respectively, and are assembled in a mating relation with each other. A cavity 6c is formed in the handle 6.

The handle 6 is provided with a first grip portion 7a at the middle portion and a second grip portion at one end thereof. The second grip portion 7b extends toward the cutting direction of a work by the circular saw blade 3 and includes a substantially flat upper surface in which an opening 8 is formed.

Figure 4:
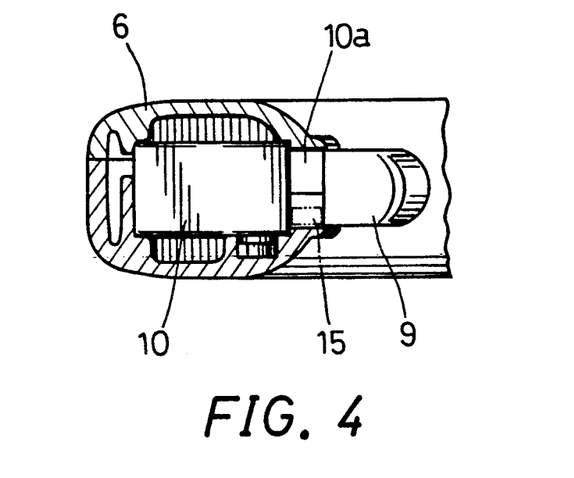
FIG. 4 is a sectional view taken along the line IV—IV of FIG. 1.

As shown in FIGS. 1 and 4, a trigger 9 is disposed at the lower portion of the first grip portion 7a. The trigger 9 can be moved into and out of the cavity 6c by the operator. A switch 10 is mounted within the cavity 6c for starting the motor M and is connected to the trigger 9 through a rod 10a. The switch 10 is normally kept off but is turned on through the movement of the rod 10a when the trigger 9 is pushed. The switch 10 can be returned to off when the operator releases the trigger 9 and the rod 10a recovers its position.

Figure 5:
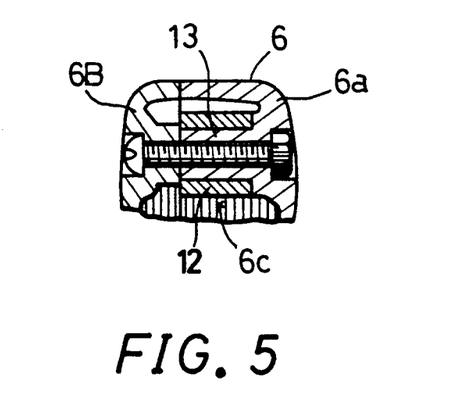
FIG. 5 is a sectional view taken along the line V—V of FIG. 1.

Lock means 11 is disposed within the cavity 6c of the handle 6. The lock means 11 includes a lever 12 of substantially inverted V-shape. The lever 12 is pivotally mounted on a shaft 13 at the bent portion of the V-shape. As shown in FIG. 5, the shaft 13 is formed integrally with the handle 6 and protrudes into the cavity 6c. One end portion of the lever 12 (right side end portion in FIG. 1) is bent upwardly and extends through the opening 8 of the second grip portion 7b. A pusher 14 of substantially rectangular shape is formed at the extremity of the above one end portion of the lever 12. The pusher 14 lies substantially parallel to the upper surface of the second grip portion 7b and has a size larger than that of the opening 8. The other end portion of the lever 12 (left side end portion in FIG. 1) extends in the vicinity of the switch 10 and includes at the extremity a hook-like lock member 15 for engaging the lower surface of the trigger 9. A spring 16 is inserted between the above one end portion of the lever 12 and the bottom surface of the cavity 6c (which corresponds to the upper surface of the motor housing 2). The spring 16 forces the lever to the counterclockwise direction in FIG. 1 so as to maintain the pusher 14 at the upper position.

Thus, the lock means 11 maintains the pusher 14 upwardly from the second grip portion 7b and also maintains the lock member 15 to engage the lower surface of the trigger 9, so that the trigger 9 is prevented from being pushed. When the operator grasps the second grip portion 7b and pushes the pusher 4, the lock member 15 is moved away from the lower surface of the trigger 9, so that the trigger can be pushed into the handle 6.

When a cutting operation is performed with the tool in the state shown in FIG. 1, the lock member 15 engages the lower surface of the trigger 9, and the trigger 9 is prevented from moving when the operator grasps the handle 6 in a hand W at the first grip portion 7a and pushes the trigger 9. Therefore, the switch 10 cannot be turned on through the operation of the trigger 9.

Figure 3:
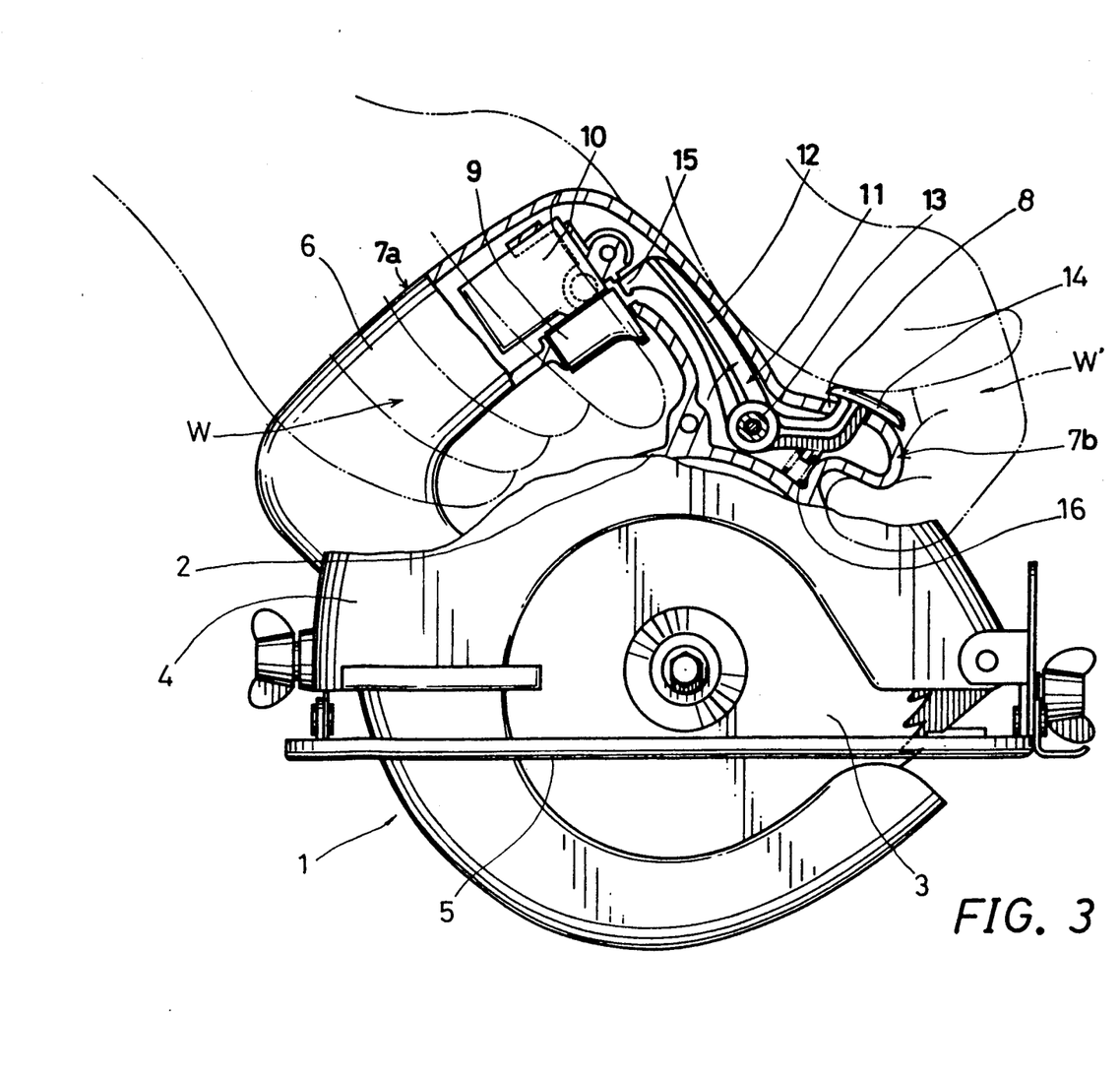
FIG. 3 is a side view similar to FIG. 1, but showing the operation of prevention means by hands of an operator.

As shown in FIG. 3, when the operator grasps the second grip portion 7b in another hand W' or puts the hand W' on at the area including the pusher 14 of the lock means 11 at the same time with grasping the first grip portion 7a in the hand W, the pusher 14 is pushed toward the cavity 7c by such action of grasping the second grip portion 7b in the hand W' or putting the hand W' on, so that the lever 12 of the lock means 11 is pivoted around the shaft 13 in a clockwise direction against the force of the spring 16 and consequently, the lock member 15 is moved from the lower surface of the trigger 9. Thus, the trigger 9 is released from the engagement by the lock means 11 and is permitted to be pushed into. When the trigger 9 is pushed in this stage, the switch 10 is turned on through the rod 10a, so that the motor M is started. This means that the cutting operation is performed by grasping the handle 6 at the first grip portion 7a and the second grip portion 7b with both hands W and W', respectively.

From the foregoing description, it can be appreciated that in the portable circular saw of this embodiment, the saw shoe 5 can be reliably positioned against the work, so that the circular saw blade 3 can be easily positioned in alignment with a marking line marked on the work. This can lead to increased efficiency of operation.

Figure 6:
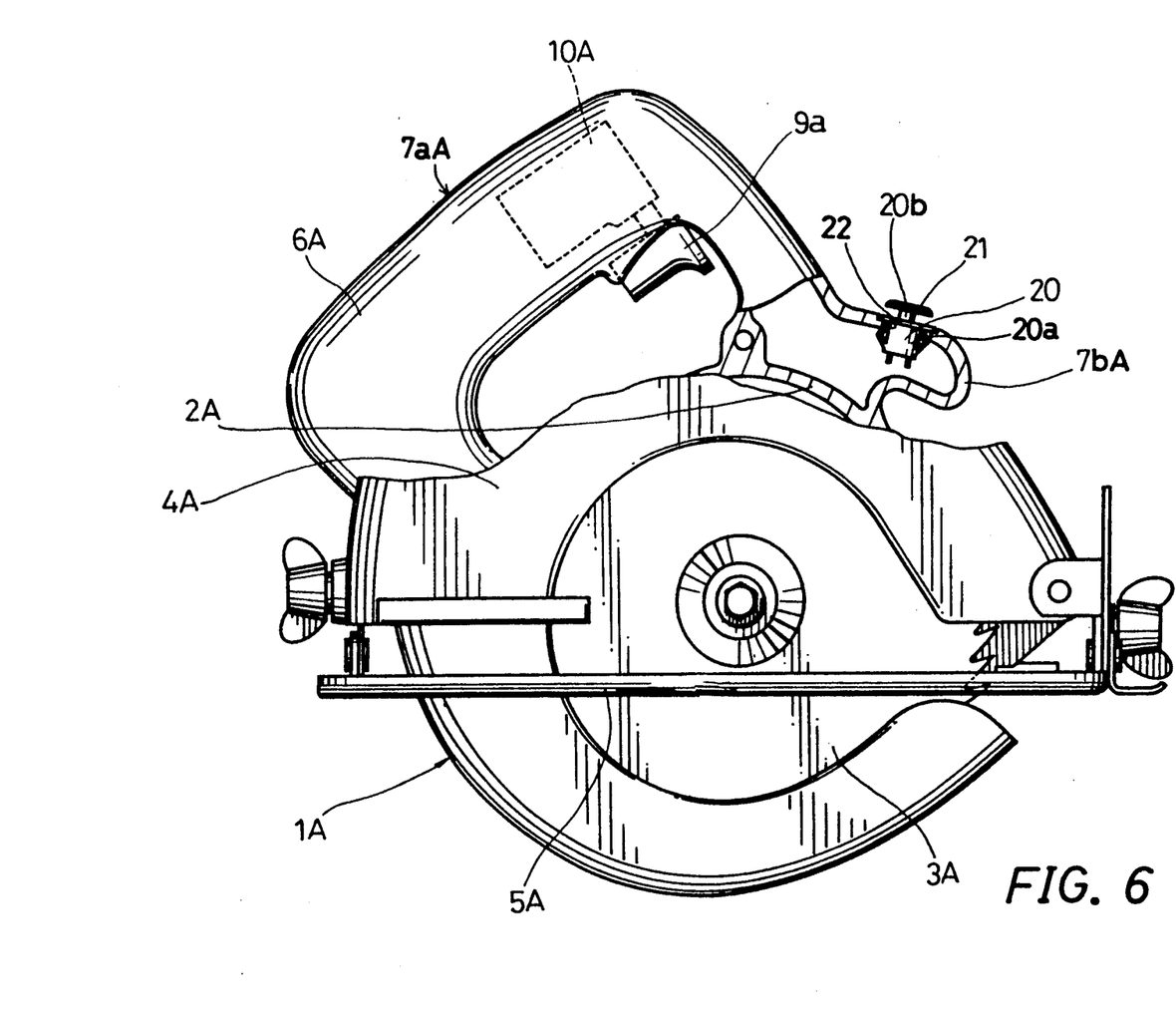
FIG. 6 is a side view of a portable circular saw according to a second embodiment of the present invention, with a part of the handle broken away.
Figure 7:
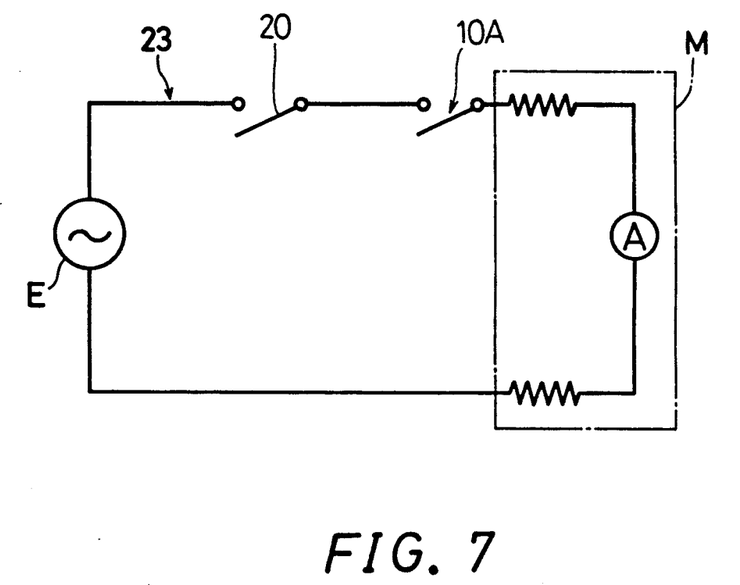
FIG. 7 is a circuit connecting a motor with a power source of the saw shown in FIG. 6.

Referring to FIGS. 6 and 7, there is shown a portable circular saw according to a second embodiment of the present invention.

In this embodiment, switch means is provided in place of the lock means 11 of the first embodiment. As shown in FIG. 6, on the upper portion of a second grip portion 7bA, the construction of which is the same as the second grip portion 7b, there is provided another switch 20 in addition to a switch 10A for starting the motor M. The switch 20 includes a body 20a mounted to an opening 22 formed in the second grip portion 7bA, a rod 20b extending upwardly from the body 20a and a flat pusher 21 formed on the upper end of the rod 20b. The rod 20b is maintained at an extended position by means of a spring (not shown) so that the pusher 21 is positioned above the second grip portion 7bA as shown in FIG. 6. As shown in FIG. 7, the switch 20 is connected in series with the switch 10A in a circuit 23 which connects the motor M with a power source E. (The FIG. 7 corresponds to the circuit of the first embodiment when the switch 20 is removed.) The switch 20 is kept off when the pusher 21 is maintained at the upper position as shown in FIG. 6. The switch 20 is turned on when the operator grasps the second grip portion 7bA and the pusher 21 is pushed until it abuts on the body 20a. In other respect, the construction of the second embodiment is the same as that of the first embodiment, and therefore, their description will not be repeated by affixing "A" to the numerals of the corresponding parts of the first embodiment in FIG. 6.

When a cutting operation is performed with the tool in the state shown in FIG. 6, even if the operator grasps a handle 6A at a first grip portion 7aA and pushes a trigger 9A so as to turn the switch 10A on, the switch 20 is maintained off and the motor M cannot be started.

When the operator grasps the first grip portion 7aA to turn the switch 10A on through the trigger 9A by one hand and also grasps the second grip portion 7bA by another hand at the area including the pusher 21 of the switch 20 or puts the another hand on the second grip portion 7bA or the pusher 21, the pusher 21 is pushed toward the body 20a and the switch 20 is turned on through the rod 20b. In this state, both switches 10A and 20 turn on, so that the motor M is started. Thus, the cutting operation can be performed with the handle 6A of the body 1A grasped with both hands at the first grip portion 7aA and the second grip portion 7bA.

Further, in this embodiment, when the operator releases his grip on the second grip portion 7bA or takes his hand off the top of the second grip portion 7bA, the switch 20 immediately turns off. Therefore if the switch 10A is kept on through the push of the trigger, the motor M can be immediately stopped. In other respect, the operation and effects are the same as those of the first embodiment.

Additionally, the switch 20 may be a contactless switch which can be turned on by the operator's action such as the action of grasping by a hand.

Although in the above first and second embodiments, the first and second grip portions 7a, 7b and 7aA, 7bA are integrally formed in the handles 6 and 6A, respectively, the second grip portions 7b and 7bA may be formed separately from the handles 6 and 6A. Thus, the second grip portions 7b and 7bA may be formed as different parts which can be grasped at different positions.

While the invention has been described with reference to preferred embodiments thereof, it is to be understood that modification or variations may be easily made without departing from the scope of the present invention which is defined by the appended claims.

What is claimed is:

1. A portable power driven tool comprising:
   a body having a motor therein;
   a handle including a first grip portion adapted to be grasped by an operator in one hand and a second grip portion adapted to be grasped by the operator in another hand and disposed at a position different from said first grip portion;
   a switch provided in a circuit connecting said motor with a power source, said switch being operably by the operator at said first grip portion so as to be turned on or off for starting or stopping said motor; and
   prevention means operable by the operator at said second grip portion for preventing said motor from being started by said switch, said switch including a switch body and an operating member mounted on said first grip portion and movable between a first position to turn said switch body on and a second position to turn the same off and wherein said prevention means includes lock means which can selectively prevent said operating member from moving to said first position from said second position, said first grip portion and said second grip portion being integrally formed in said handle;
   said handle including a cavity therein extending from said first grip portion to said second grip portion; and
   said lock means including a lever pivotally mounted on said handle within said cavity, a lock member mounted on one end of said lever and movable between a lock position for engagement with said operating member positioned at said second position, and a non-lock position to permit movement of said operating member to said first position from said second position, and a pusher mounted on the other end of said lever and extending outwardly from said second grip portion of said handle, said pusher being operably by the operator, and a spring forcing said lever to maintain the position of said lock member at said lock position;
   whereby said lock member can be moved to said non-lock position from said lock position when said handle is grasped by the operator at said second grip portion and said pusher is pushed.

2. The portable power driven tool as defined in claim 1 wherein:
   the other end of said lever is connected to said pusher through an opening formed in said second grip portion;
   the size of said pusher is larger than that of said opening; and
   the pusher is positioned above said handle to maintain a suitable clearance therebetween when said lock member is positioned at said lock position;
   whereby said lock member is moved to said non-lock position when said pusher is pushed until it abuts on said handle around said opening.

3. A portable power driven tool comprising:
   a body having a motor therein;
   a handle including a first grip portion adapted to be grasped by an operator in one hand and a second grip portion adapted to be grasped by the operator in another hand and disposed at a position different from said first grip portion;
   a switch provided in a circuit connecting said motor with a power source and being operable by the operator at said first grip portion so as to be turned on or off for starting or stopping said motor, said switch including a switch body and an operating member mounted on said first grip portion, said operating member being normally kept in a first position to keep said switch body off and being movable to a second position so as to turn on said switch body by one hand of the operator when said first grip portion is grasped in said one hand; and
   lock means operable by the operator at said second grip portion for preventing said motor from being started, said lock means normally preventing said operating member from moving to said second position while permitting said operating member to move to said second position by said another hand of the operator only when the second grip portion is grasped by said another hand.

4. The portable power driven tool as defined in claim 3 wherein:
   said first grip portion and said second grip portion are integrally formed in said handle;

said handle includes a cavity extending from said first grip portion to said second grip portion; and said lock means includes a lever pivotally mounted on said handle within said cavity, a lock member mounted on one end of said lever and movable between a lock position for engagement with said operating member positioned at said second position, and a non-lock position to permit movement of said operating member to said first position from said second position, and a pusher mounted on the other end of said lever and extending outwardly from said second grip portion of said handle, said pusher being operable by the operator, and a spring forcing said lever to maintain the position of said lock member at said lock position;

whereby said lock member can be moved to non-lock position from said lock position when said handle is grasped by the operator at said second grip portion and said pusher is pushed.

5. The portable power driven tool as defined in claim 4 wherein:

the other end of said lever is connected to said pusher through an opening formed in said second grip portion;

the size of said pusher is larger than that of said opening; and the pusher is positioned above said handle to maintain a suitable clearance therebetween when said lock member is positioned at said lock position;

whereby said lock member is moved to said non-lock position when said pusher is pushed until it abuts on said handle around said opening.

6. The portable power driven tool as defined in claim 3 wherein:

said first grip portion and said second grip portion are integrally formed in said handle;

said lock means including a lever pivotally mounted on said handle, a lock member mounted on one end of said lever and movable between a lock position for engagement with said operating member positioned at said second position, and a non-lock position to permit movement of said operating member to said first position from said second position, and a pusher mounted on the other end of said lever and extending outwardly from said second grip portion of said handle, said pusher being operable by the operator, and biasing means for forcing said lever to maintain the position of said lock member at said lock position;

whereby said lock member can be moved to said non-lock position from said lock position when said handle is grasped by the operator at said second grip portion and said pusher is pushed.

* * * * *